2 Sheets—Sheet 1.
A. W. McKOWN.
AUXILIARY WAGON-SPRING.
No. 192,775. Patented July 3, 1877.
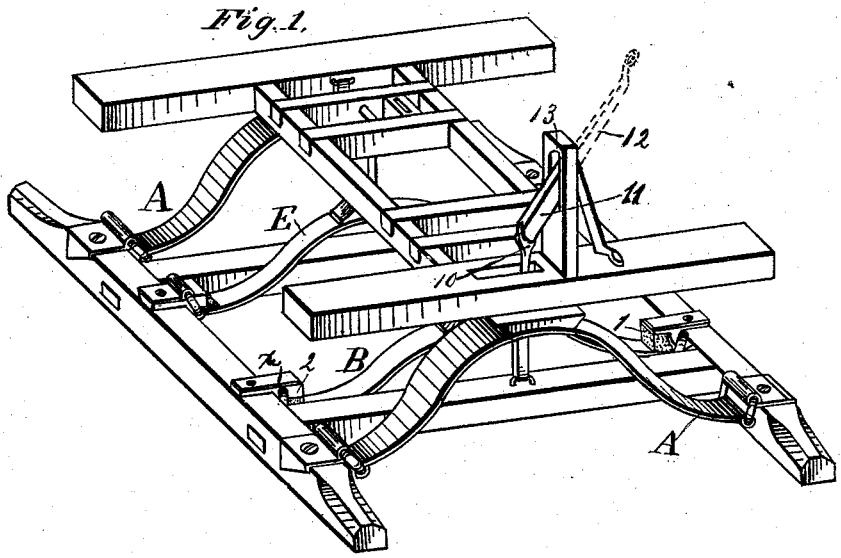
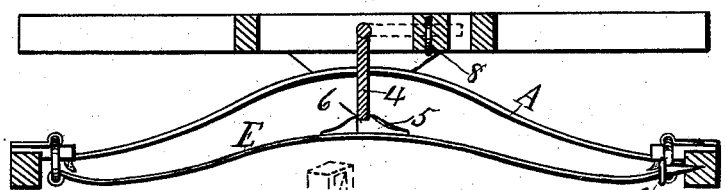
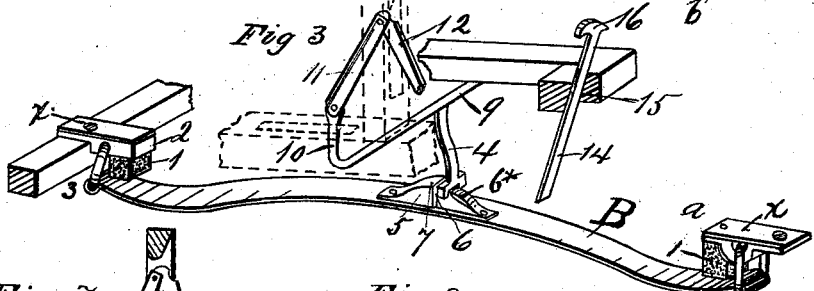
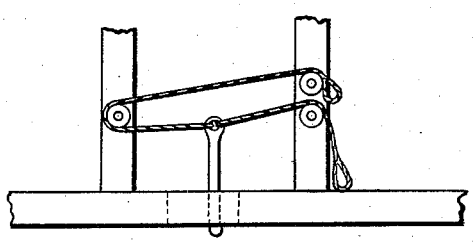
Witnesses
W. R. Edsler
Pennington Halsted
Inventor
Alex. W. McKown
per John J. Halsted.
Atty.

A. W. McKOWN.
AUXILIARY WAGON-SPRING.

No. 192,775.  Patented July 3, 1877.

Witnesses
W. R. Edelen.
Pennington Halsted

Inventor
Alexander W. McKown
per John J. Halsted
Atty.

UNITED STATES PATENT OFFICE.

ALEXANDER W. McKOWN, OF KIMBLE, PENNSYLVANIA.

IMPROVEMENT IN AUXILIARY WAGON-SPRINGS.

Specification forming part of Letters Patent No. 192,775, dated July 3, 1877; application filed June 1, 1877.

*To all whom it may concern:*

Be it known that I, ALEXANDER W. MC-KOWN, of Kimble, in the county of Pike and State of Pennsylvania, have invented certain new and useful Improvements in Auxiliary Wagon-Springs; and I do hereby declare that the following is a full, clear, and exact description thereof, which will enable others skilled in the art to which it appertains to make and use the same, reference being had to the accompanying drawings, and to the letters of reference marked thereon, which form a part of this specification.

My present improvement relates to auxiliary or re-enforcing springs used in aid of the mainsprings of vehicles, and more especially to novel modes of hanging the same; of novel devices for putting them into or out of their re-enforcing condition; and novel means for packing to avoid rattling, and save wear, beside other details, hereinafter stated.

They may be deemed as further improvements upon inventions described in some of my former patents, more notably that of March 19, 1872, No. 124,756, in which auxiliary flat springs were employed; but my present invention is applicable to springs whether ribbed, oval, or round; as, also, to flat springs, and to springs which are partly flat and partly of any other shape.

Figure 4:
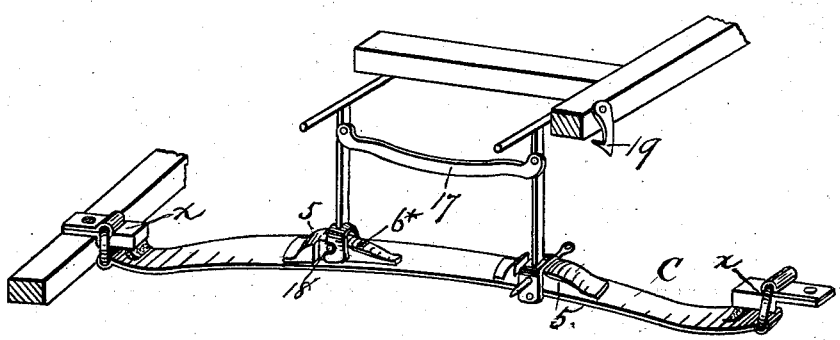
Figure 5:
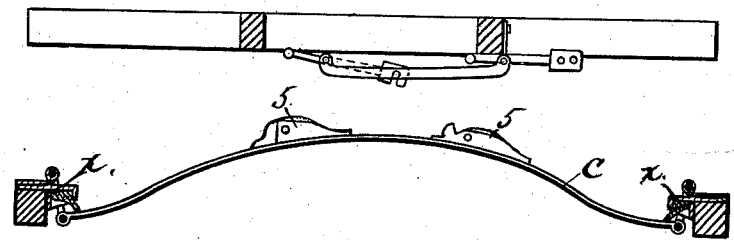
Figure 6:
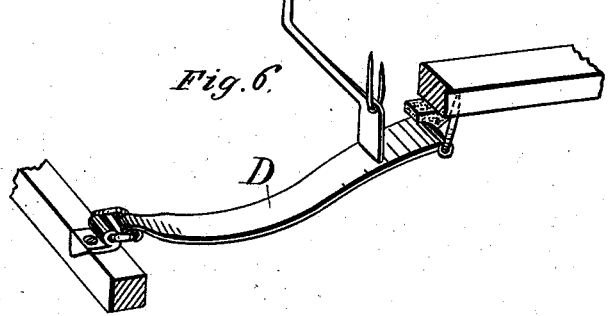

In the drawings, Figure 1 is a perspective of a wagon-frame with mainsprings and with auxiliary springs illustrating my improvement; Fig. 2, a side elevation, the auxiliary spring being in operative condition; Fig. 3, a mode of connecting and disconnecting an auxiliary spring; Fig. 4, a double connecting and disconnecting device; Fig. 5, a side elevation of Fig. 4, the connecting devices being held up out of action; Figs. 6 and 7, details; and Fig. 8, a modification of part of Fig. 3.

In all the figures, A indicates the main or ordinary springs, and B C D E, severally, an auxiliary or re-enforcing spring, with my several improvements shown as applied to one or the other of them, it being understood, of course, that such only of these auxiliary springs as may be found desirable is to be applied to a single vehicle.

I hang the auxiliary spring B to the axle, bolster, or other suitable support by means of a projection bracket or shackle, $x$, held by bolts or clips thereon, which extend beyond the point where the link to which the spring is attached is hung. The object of this projection is to afford a means for holding a rubber or other elastic packing, 1. This packing is, preferably, incased, at its sides and top, within a box, 2, from the under side of which it projects, as seen at 2 in Fig. 3, and the location of the link, it will be observed, is between the packing and the axle or other support for the shackle or part 3. The advantages gained by this construction are, first, that rattling is prevented by the packing, which is placed in the most desirable location for the purpose, and in immediate proximity to the point where the rattling ordinarily takes place, and reducing the vibration of the spring when the spring is not in its re-enforcing position; second, it prevents the spring flying up and carrying the link up with it, so that one end of the spring shall be caught and held up, which is apt to occur with existing constructions in driving fast over rough places when the springs are disconnected; and, further, the auxiliary springs have so little arch, as compared with the main springs, that, as a general rule, they require to be hung with links more nearly perpendicular, which requires the packing to be placed as shown, to prevent the springs thus flying up and thus catching on top of the link; and, thirdly, when the spring is connected for re-enforcing, the pressure of the load upon it forces down the spring so as to clear the rubber, if the latter be placed pretty well forward of the link, and saves wear of the rubber.

Several modes of attaching the links and of applying and arranging the rubber are shown.

At $a$ the rubber is held to place by a bolt or rivet extending partly through it; and at $b$ one link is shown positively fastened down to a vertical position, while the one on the opposite end of the same spring is free to have a limited swing. This is merely to illustrate that one end of the auxiliary spring may, if desired, be hinged, instead of linked.

The next branch of my invention relates to the devices for connecting or disconnecting the auxiliary springs, to re-enforce or not, when desired.

The spring B or E being hung, as above described, I attach at its center a metallic bearing, 5, which may be from three to twenty inches long, and secured to the spring by bolts, rivets, or clips. This bearing has a receiving-notch, 6, in which the connecting device rests when in its re-enforcing position, the rear end of this notch having a barrier or projections adapted to arrest or limit the movement of the connecting device, so that it will not go back of the proper position to drop into the notch; and forward of this notch the bearing is reduced at its sides or rounded off to serve as a guide, 6*, to the pronged or yoke-connecting device 4 when the latter is being swung down to position. The prongs, in that case, come down astride the bearing, spanning it at both sides, and, moving to place, slide up to position until arrested by the higher and wider projection 7 at the rear of the central notch 6. When thus in place the stock or shank of the yoke stands upright, bracing the spring, and its progress extends down each side of the bearing, below the receiving-notch 6, so that the locking device cannot move sidewise, and the spring is brought into and held in its re-enforcing position, and also prevented from swaying sidewise or away from the yoke. The receiving-notch prevents the yoke-bar from swinging either backward or forward.

When the yoke-bar is swung up out of its re-enforcing position it may be held up to the body or frame by any suitable device—as, for instance, a spring-catch, 8; but, if it be desired to operate the device without getting out of the wagon, I attach to the axis or rocker 9 of the yoke-bar an arm or handle, 10, or make the same integral therewith. This may be operated by a jointed arm, 11 12, attached to the handle, as seen, the joints being preferably packed with leather, and the handle passing through a hole in the frame, and the jointed parts 11 12 arranged to pass through a slot in the post 13 of the seat-frame or other convenient part. If the parts 10 11 be jointed together, as shown, instead of being rigid and all in one, then, when the yoke-bar is in re-enforcing position, the joint comes within the slot in post 13, and the part 12 may be turned down out of the way, as seen in Fig. 3; but when the device is swung up out of re-enforcing position, the parts 10 and 11 may close their joint and assume a straight line, and the whole be locked to position by any detent or catch suitable for fastening the outer end of 12 to the post, or it may be held by gravity. Instead of the jointed arrangement just described, the arm or handle may be operated by two straps or cords, one passing around a pulley, and both passing through the post, so as to be accessible. The pulling of one cord will lift the yoke, and the pulling of the other will lower it. (See Fig. 8.)

To press down the spring in order to disengage it from the yoke-bar without getting out of the wagon, I employ a tool, 14, adapted to be passed through a slot, 15, in the bottom of the wagon, and, by pushing down this tool, the spring will be released from the yoke, which may then be raised and held up. The cross-head 16 of this tool prevents its being pushed down too hard upon the spring beyond what is required for the disengagement. When the wagon is such that it is not desired to disengage it from inside the wagon, a lever or any convenient means will suffice for this purpose.

At C I have shown two bearings, 5, on one spring and two connecting devices, which are linked together by a secondary rod, 17, so as to be simultaneously operated. One of the yokes has notches to admit pins 18 on the bearing, and the other has a bolt to pass through eyes in the prongs. On releasing this bolt both yoke-arms, upon depressing the spring, become free to be swung up together, and a latch, 19, may fasten them up.

D is a short or half spring hung both directly on the axle or bolster, and also to the body of the wagon, and packed with rubber at its upper end to avoid rattling. It may have a connecting and disconnecting device like that shown on spring E, or, instead of this, it may be operated by the device shown in Fig. 6. This spring D has a hinge at one end and a link at the other. It may have links at both ends; and, as its object is to get re-enforcement at either end of, or near one corner of, the vehicle, one end must be hung by a hinge to the body of the vehicle; but it should not be hinged at both ends.

The long auxiliary springs, as heretofore stated, may at one end be hung as a hinge, the link at its other end permitting it to sway backward or forward, when pressed down or released.

Check-straps are attached to the perches and bearings on mainsprings, or to the box or body (for any of the arrangements shown or described) to prevent the connecting devices being thrown out of the connecting position in driving fast over rough places, and to prevent upward strains on the mainsprings under said conditions.

I claim—

1. The combination of a shackle or bracket, x, projecting inward from the axle or bolster, a yielding packing under its forward end, and a link hung between the axle or bolster and such packing, substantially as shown and described.

2. In combination with an auxiliary wagon-spring, and with a device for connecting and disconnecting the same, a bearing, 5, constructed with a notch and stop, substantially as and for the purpose described.

3. The bearing 5 adapted for application to an auxiliary spring, and constructed with a yoke-receiving guide, 6*, notch 6, and a portion at the rear of the notch, to serve as a stop or detent, substantially as shown and described.

4. In combination with the auxiliary springs and the described bearing or bearings thereon, a disconnecting device or devices, arranged to be swung down, and provided with a fork or yoke at its lower end, adapted to stride such bearing and to engage therewith, substantially as shown and described.

5. The combination with the yoke-bar and its arm or handle 10, a jointed part, or its described equivalent for operating the same and passing through a slot in an upright part of the seat or body, substantially as and for the purpose set forth.

6. The short or half spring D, hung at one end directly to the axle or bolster, and hinged or linked at its other end under the body of the wagon, and provided with a device adapted to bear upon or release the same at a point between its ends, substantially as shown and described.

ALEXANDER W. McKOWN.

Witnesses:
EPHRAIM KIMBLE,
J. F. DECKER.